INVENTOR.
JOHN BALOGH
ATTORNEYS 3,397,136
CORONA TREATING APPARATUS HAVING
AN ELECTRODE WITH AN ADJUSTABLE
WIDTH
John Balogh, Oakland, N.J., assignor to Deerpark
Machine Co., Hawthorne, N.J., a corporation of
New Jersey
Filed Oct. 7, 1965, Ser. No. 493,809
4 Claims. (Cl. 204—312)

This invention relates to an electrical discharge apparatus and refers more particularly to an electrical discharge apparatus suitable for treating plastic materials.

Plastic materials, including polyethylene plastics, are now being treated by discharging electrical currents upon surfaces of these materials so as to make them suitable for printing. Surfaces thus treated readily hold printing inks and dyes, although they were not able to do so prior to the treatment.

Prior art apparatus usually consists of an anode constituted by elongated conducting bar from which current is discharged upon the material. An apparatus of this type is not suitable for the treatment of plastic materials of different widths or for treating electrically different sections of the plastic surface, while leaving untreated other sections of the same surface.

An object of the present invention is to eliminate the drawbacks of prior art anodes and to provide a discharge apparatus which can be quickly and readily adapted for treating plastic surfaces of a great variety of widths and for treating any desired portions of these surfaces, such as the edge portions or central portions, while leaving untreated the remaining portions of the same surfaces.

Other objects of the present invention will become apparent in the course of the following specification.

In the accomplishment of the objectives of the present invention it was found desirable to provide an anode bar composed of a plurality of current-transmitting anodes which are swingably mounted side by side upon the conducting bar. Each anode can be swung individually from a downwardly extending operative position to an upwardly extending inoperative position and can be held in any one of these positions by conducting supporting rods.

This arrangement makes it possible to adapt the number and the location of operative anodes to plastic materials of a large variety of widths and/or to treat electrically any desired sections of the surfaces of these materials.

Other features of the present invention will appear from the following detailed description when taken in connection with the accompanying drawings showing by way of example only, a preferred embodiment of the inventive idea.

Figure 1:
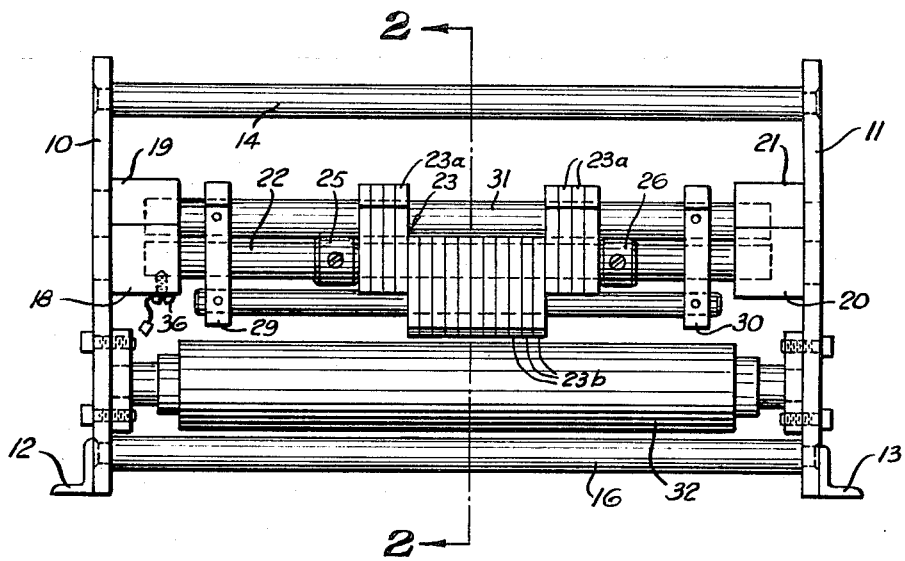
FIGURE 1 is a front view of an electrical discharge apparatus constructed in accordance with the principles of the present invention.

The apparatus shown in the drawings includes two end plates 10 and 11 supported by legs 12 and 13, respectively, and interconnected by four tie bars 14, 15, 16 and 17, preferably made of steel and connected adjacent the four corners of the end plates. The plates 10 and 11 may be provided with a cover and with ozone exhausting means (both not shown).

Figure 2:
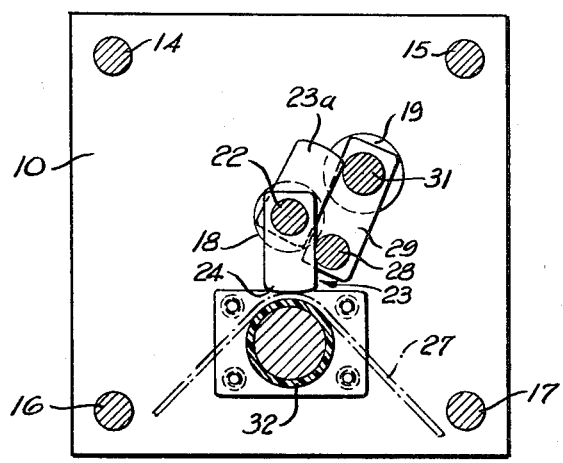
FIGURE 2 is a transverse section along the line II—II of FIG. 1.

The end plate 10 carries two supports 18 and 19 consisting of acrylic insulation material. The end plate 11 carries two similar opposed insulation supports 20 and 21. The supports 18 and 20 carry a conducting shaft 22 serving as a pivot bar for the aluminum anodes 23. The anodes 23 are swingably mounted one next to the other upon the shaft 22. Each anode has the shape of a plate having a somewhat curved discharging edge 24. The anodes 23 are located between two rings 25 and 26. Obviously, the shaft 22 may be of any suitable length and may carry any desired number of anodes 23. The anodes 23 may be swung manually or by any other suitable means (not shown) from a downward operative position to an upper inoperative position and vice versa. In the drawing end anodes 23a are shown as being in an upper inoperative position while central anodes 23b are located in a lower operative position. Thus a section of the material 27 (shown by broken lines in FIG. 2) which is equal in width to the width of the downwardly extending anodes 23b will be subjected to the electrical treatment.

The downwardly extending anodes 23b engage a conducting shaft 28 which limits the downward movement of the anodes. The shaft 28 is carried by two steel plates 29 and 30 which extend obliquely and the upper ends of which are firmly connected to a conducting shaft 31. The shaft 31 is used to limit the upper movement of the anodes and it is adapted to engage the upwardly extending anodes 23a. The shaft 31 has two ends mounted in the insulating supports 19 and 21.

The material 27 which is to be electrically treated is passed over an idler roller 32 which is enclosed by a wrapper of "Mylar" or any other suitable dielectric material. Any suitable means (not shown) may be used for moving the material 27 over the roller 32 in closed proximity to the lower edges 24 of the downwardly extending anodes 23b.

A conducting pin 36 (FIG. 1) extends into the insulating support 18 and is conductively connected with the shaft 22. An electrical current of suitable high voltage is supplied to the pin 36 by any suitable source. The ground can constitute the second terminal.

In operation, the operator starts by adjusting the anodes 23, moving downwardly the number of anodes required to treat a specific width of material. These anodes 23b will engage the shaft 28. Anodes 23a which are not being used are swung upwardly until they engage the shaft 31. Then the generator 33 is started and the material 27 is moved over the roller 32 while electrical discharge takes place between the material and the anodes 23b. The treated material is then ready for any desired printing and dyeing operations.

As soon as a material of different width is provided the operator will adjust the anodes 23 accordingly while the generator 33 is switched off.

It is apparent that the example described above has been given solely by way of illustration and is capable of many variations and modifications within the scope of the present invention.

What is claimed is:

1. An apparatus for treating a piece of material in a corona discharge, said apparatus comprising an elongated conducting rod, a plurality of anodes located side by side upon said rod and swingable individually from an operative position to an inoperative position and vice versa, means for supporting the material adjacent the anodes located in their operative positions said means including an electrically conductive electrode and a dielectric material covering said electrode and means supplying an electrical current to said electrode and to said rod and said anodes.

2. An apparatus in accordance with claim 1, wherein the electrode comprises a roller with said dielectric covering enclosing said roller.

3. An apparatus in accordance with claim 1, further comprising a conducting shaft extending parallel to said rod and engaging the anodes located in their operative position and another conducting shaft extending parallel to said rod and engaging the anodes located in their inoperative position.

4. An apparatus in accordance with claim 3, further comprising two end plates, insulating supports carried by said end plates and supporting said bar and the second-mentioned shaft and plates carried by the second-mentioned shaft and supporting the first-mentioned shaft, and wherein the second-mentioned means comprise a current-receiving pin carried by one of said insulating supports and conductively engaging said bar.

References Cited

UNITED STATES PATENTS 3,291,711  12/1966  Moyer _____ 204—165
3,174,748  3/1965  Roberts et al. _____ 271—8

FOREIGN PATENTS 1,004,230  11/1951  France.

ROBERT K. MIHALEK, *Primary Examiner.*